United States Patent
Lee

(10) Patent No.: US 12,319,175 B2
(45) Date of Patent: Jun. 3, 2025

(54) SYSTEM AND METHOD FOR EVALUATING PRESSURE SENSATION OF VEHICLE SEAT

(71) Applicants: Hyundai Motor Company, Seoul (KR); Kia Corporation, Seoul (KR)

(72) Inventor: Baek Hee Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 249 days.

(21) Appl. No.: 17/828,542

(22) Filed: May 31, 2022

(65) Prior Publication Data
US 2023/0010702 A1    Jan. 12, 2023

(30) Foreign Application Priority Data

Jul. 6, 2021 (KR) ................... 10-2021-0088345

(51) Int. Cl.
*B60N 2/02* (2006.01)
*B60N 2/00* (2006.01)

(52) U.S. Cl.
CPC ......... *B60N 2/0284* (2013.01); *B60N 2/0021* (2023.08); *B60N 2/0033* (2023.08); *B60N 2/0224* (2013.01); *B60N 2/0273* (2023.08); *B60N 2/0268* (2023.08); *B60N 2210/40* (2023.08); *B60N 2230/30* (2023.08)

(58) Field of Classification Search
CPC .... B60N 2/0284; B60N 2/002; B60N 2/0244; B60N 2/0268; B60N 2/62; B60N 2/0224; B60N 2/0272; B60N 2/12; B60N 2/16; B60N 2/58; B60N 2/914
See application file for complete search history.

(56) References Cited

U.S. PATENT DOCUMENTS

| | | | |
|---|---|---|---|
| 10,207,600 B2* | 2/2019 | Xu | B60N 2/002 |
| 11,504,540 B2* | 11/2022 | Lee | B60N 2/16 |
| 2018/0264974 A1* | 9/2018 | Ramachandran | B60N 2/0034 |
| 2019/0084447 A1* | 3/2019 | Lee | B60N 2/14 |
| 2019/0248260 A1* | 8/2019 | Yoshikawa | B60N 2/2222 |
| 2019/0389330 A1* | 12/2019 | Yin | B60Q 9/00 |
| 2020/0023753 A1* | 1/2020 | Alequin | B60K 35/25 |
| 2020/0238875 A1* | 7/2020 | Godlewski | B60N 2/99 |
| 2020/0253381 A1* | 8/2020 | Dörfler | A47C 7/20 |
| 2020/0324675 A1* | 10/2020 | Yamamoto | B60N 2/0027 |
| 2021/0221270 A1* | 7/2021 | Ward | B60N 2/026 |
| 2021/0237617 A1* | 8/2021 | Kaku | G01S 19/01 |
| 2021/0316691 A1* | 10/2021 | Ito | B60N 2/22 |
| 2022/0063453 A1* | 3/2022 | Hernandez | A61B 5/1036 |
| 2022/0135055 A1* | 5/2022 | Kim | A61M 21/00 701/36 |
| 2022/0169164 A1* | 6/2022 | Migneco | B60N 2/99 |
| 2022/0410778 A1* | 12/2022 | Thyagarajan | G06V 20/593 |
| 2023/0001129 A1* | 1/2023 | Ito | B60N 2/0022 |

\* cited by examiner

*Primary Examiner* — Abdalla A Khaled
(74) *Attorney, Agent, or Firm* — Fox Rothschild LLP

(57) ABSTRACT

A system and method for evaluating pressure sensation of a vehicle seat in which body pressure sensors installed in a bolster of a seat cushion measure a body pressure are provided. The pressure sensation due to the bolster and a shield cover of the seat cushion is determined by analyzing the magnitudes of the measured body pressure and the distribution chart thereof. Whether the pressure sensation is caused by the bolster or the shield cover is determined based on the magnitudes of the body pressure and the distribution chart thereof to adjust the seat cushion to a position to release the pressure sensation.

11 Claims, 7 Drawing Sheets

SYSTEM AND METHOD FOR EVALUATING PRESSURE SENSATION OF VEHICLE SEAT

CROSS-REFERENCE TO RELATED APPLICATION

This application claims under 35 U.S.C. § 119(a) the benefit of priority to Korean Patent Application No. 10-2021-0088345 filed on Jul. 6, 2021, the entire contents of which are incorporated herein by reference.

BACKGROUND

(a) Technical Field

The present disclosure relates to a system and method for evaluating pressure sensation of a vehicle seat, and more particularly, to a system and method for evaluating pressure sensation of a vehicle seat in which the magnitudes of the pressure sensation on the lower body of a passenger due to a bolster or a shield cover of a seat cushion may be evaluated, and the seat cushion may be adjusted to a position to release the pressure sensation.

(b) Background Art

In general, a vehicle seat includes a seat cushion configured such that the lower body of a passenger is placed thereon, a seat back configured such that the passenger leans back thereagainst, and a headrest configured to support the neck and the head of the passenger.

Various mechanisms configured to adjust the posture of the vehicle seat are installed inside the seat cushion and the bottom portion thereof. For example, a transfer rail coupled to a stationary rail mounted on a floor panel to be transferred is mounted on a seat cushion frame, which is the inner frame of the seat cushion, and various parts, including a motor configured to adjust a tilting angle, a height and a forward and backward position of the seat cushion, links, wiring, etc., are intensively mounted on the floor panel.

Referring to FIG. 1, a shield cover 20 configured to shield various parts is mounted at each of the side parts of a seat cushion 10 to improve the external appearance of a vehicle seat. Further, the shield cover 20 provides a mounting place on which switches 22 configured to adjust a tilting (reclining) angle, a height and a forward and backward position of the vehicle seat are mounted.

In addition, a bolster 12 having a designated shape and height to prevent the lower body of a passenger from leaning to a left or right side and to stably support the lower body of the passenger is formed at each of both side ends of the seat cushion 10. However, when the lower body of the passenger is in direct or indirect pressurized contact with the bolster 12 or the shield cover 20, the passenger may feel pressure sensation and discomfort in his/her lower body.

For example, when the lower body (the hips, thighs, etc.) of the passenger comes into pressurized contact with the bolster 12 or the shield cover 20 while the passenger enters or exits a vehicle, when the passenger perches on the bolster 12 or the shield cover 20 to rest in the parked state of the vehicle, or when the lower side part of the lower body (the hips, thighs, etc.) of the passenger seated on the seat cushion 10 comes into pressurized contact the bolster 12 and simultaneously the load of the lower body of the passenger is transmitted to the shield cover 20, the lower body of the passenger comes into direct or indirect pressurized contact with the bolster 12 and the shield cover 20, and thus, the passenger may feel pressure sensation and discomfort in his/her lower body.

The above information disclosed in this section is merely for enhancement of understanding of the background of the invention and therefore it may contain information that does not form the prior art that is already known in this country to a person of ordinary skill in the art.

SUMMARY

The present invention has been made in an effort to solve the above-described problems associated with the prior art, and it is an object of the present invention to provide a system and method for evaluating pressure sensation of a vehicle seat in which body pressure sensors installed in a bolster of a seat cushion measure a body pressure, whether there is pressure sensation due to the bolster and a shield cover of the seat cushion is determined by analyzing the magnitudes of the measured body pressure and the distribution chart thereof, and whether the pressure sensation is caused by the bolster or the shield cover is determined depending on the magnitudes and the distribution chart of the measured body pressure, to adjust the seat cushion to a position to release the pressure sensation.

In one aspect, the present invention provides a system for evaluating pressure sensation of a vehicle seat, the system may include a seat cushion provided with a bolster formed at each of both side ends thereof, a shield cover mounted at each of both side surfaces of the seat cushion, a plurality of body pressure sensors installed in a designated arrangement within the bolster, and a seat controller connected to the body pressure sensors through signal transmission lines, wherein the seat controller may include a body pressure analysis and pressure sensation area determination unit configured to determine an area in which there is the pressure sensation on a lower body of a passenger due to the bolster or the shield cover by analyzing magnitudes of a body pressure measured by the body pressure sensors and a distribution chart thereof, an pressure sensation type determination unit configured to determine whether the pressure sensation on the lower body of the passenger is caused by the bolster or the shield cover, and a seat position control unit configured to adjust the seat cushion to a position to release the pressure sensation.

In an exemplary embodiment, the body pressure analysis and pressure sensation area determination unit may be configured to digitize the magnitudes of the body pressure measured by the body pressure sensors to distribute data, acquired by the digitization, in a matrix, may compare the magnitudes of the body pressure of a specific area included in the data distributed in the matrix, with the magnitudes of the body pressure of other areas, and may determine the specific area as the area in which there is the pressure sensation due to the bolster or the shield cover based on results of the comparison.

In another embodiment, the body pressure analysis and pressure sensation area determination unit may be configured to determine the specific area as an area in which there is the pressure sensation due to the bolster, when the magnitudes of the body pressure of the specific area are equal to or greater than a reference times the magnitudes of the body pressure of the other areas, and may determine the specific area as an area in which there is the pressure sensation due to the shield cover other than the bolster, when the magnitudes of the body pressure of the specific area are less than another reference times the magnitudes of the body pressure of the other areas.

In still another embodiment, the pressure sensation type determination unit may be configured to determine that the pressure sensation on the lower body of the passenger is caused by the shield cover when there is a vertical valley indicating the pressure sensation on the lower body of the passenger due to an edge of an upper end of the shield cover in the distribution chart of the body pressure, and may be configured to determine that the pressure sensation on the lower body of the passenger is caused by the bolster when there is no vertical valley in the distribution chart of the body pressure.

In yet another embodiment, the pressure sensation type determination unit may be configured to determine that the pressure sensation on the lower body of the passenger is caused by the shield cover when a length of the vertical valley is equal to or greater than a reference value and a width thereof is less than another reference value.

In another aspect, the present invention provides a method for evaluating pressure sensation of a vehicle seat, the method may include measuring, by a plurality of body pressure sensors installed in a bolster of a seat cushion, a body pressure of a passenger, analyzing, by a body pressure analysis and pressure sensation area determination unit, magnitudes of the body pressure and a distribution chart thereof based on signals output from the body pressure sensors, determining, by the body pressure analysis and pressure sensation area determination unit, an area in which there is the pressure sensation on a lower body of the passenger due to the bolster or a shield cover, determining whether the pressure sensation on the lower body of the passenger is caused by the bolster or the shield cover based on the magnitudes of the body pressure and the distribution chart thereof, and adjusting the seat cushion to a position to release the pressure sensation, based on the area in which there is the pressure sensation and a type of the pressure sensation.

In an embodiment, in the analyzing the magnitudes of the body pressure and the distribution chart thereof, the magnitudes of the body pressure measured by the body pressure sensors may be digitized, and data, acquired by the digitization, may be distributed in a matrix.

In another embodiment, in the determining the area in which there is the pressure sensation on the lower body of the passenger due to the bolster or the shield cover, a specific area included in the data distributed in the matrix may be determined as an area in which there is the pressure sensation due to the bolster, when the magnitudes of the body pressure of the specific area are equal to or greater than a reference times the magnitudes of the body pressure of other areas, and the specific area may be determined as an area in which there is the pressure sensation due to the shield cover other than the bolster, when the magnitudes of the body pressure of the specific area are less than another reference times the magnitudes of the body pressure of the other areas.

In still another embodiment, in the determining whether the pressure sensation on the lower body of the passenger is caused by the bolster or the shield cover, it may be determined that the pressure sensation on the lower body of the passenger is caused by the shield cover when there is a vertical valley indicating the pressure sensation on the lower body of the passenger due to an edge of an upper end of the shield cover in the distribution chart of the body pressure, and it may be determined that that the pressure sensation on the lower body of the passenger is caused by the bolster when there is no vertical valley in the distribution chart of the body pressure.

In yet another embodiment, it may be finally determined that the pressure sensation on the lower body of the passenger is caused by the shield cover when a length of the vertical valley is equal to or greater than a reference value and a width thereof is less than another reference value. In still yet another embodiment, the adjusting of the seat cushion to the position to release the pressure sensation may be performed by adjusting at least one of a position of the seat cushion in forward and backward directions, a height of the seat cushion, a tilting angle of the seat cushion, an amount of air in air cells inside the seat cushion and the bolster, or an angle of the bolster in inward and outward directions.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
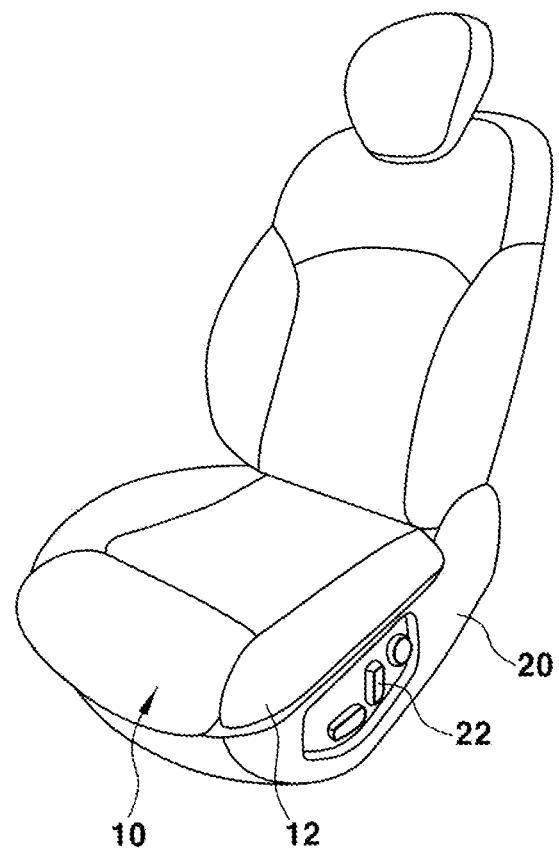
FIG. 1 is a perspective view illustrating the external appearance of a vehicle seat.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
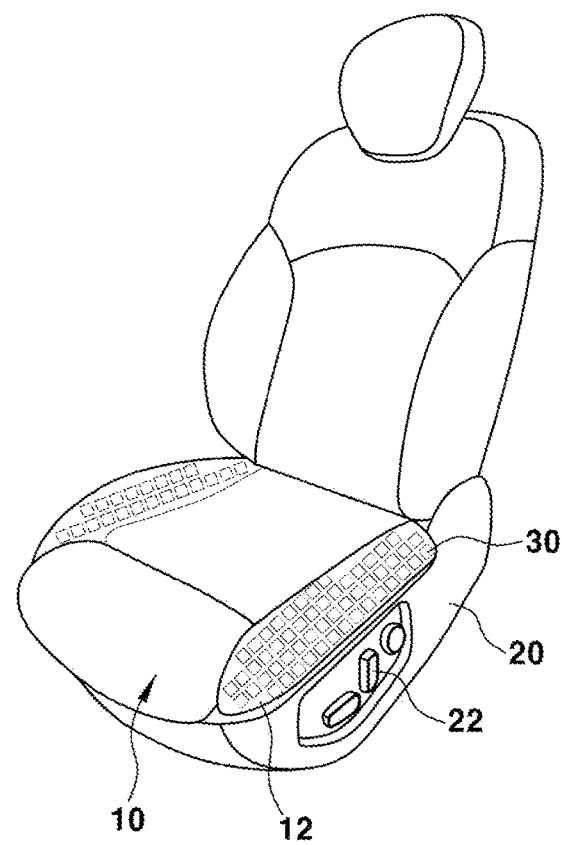
FIG. 2 is a schematic view illustrating an example in which, among elements of a system for evaluating pressure sensation of a vehicle seat according to the present invention, body pressure sensors are installed in a bolster.
Figure 3:
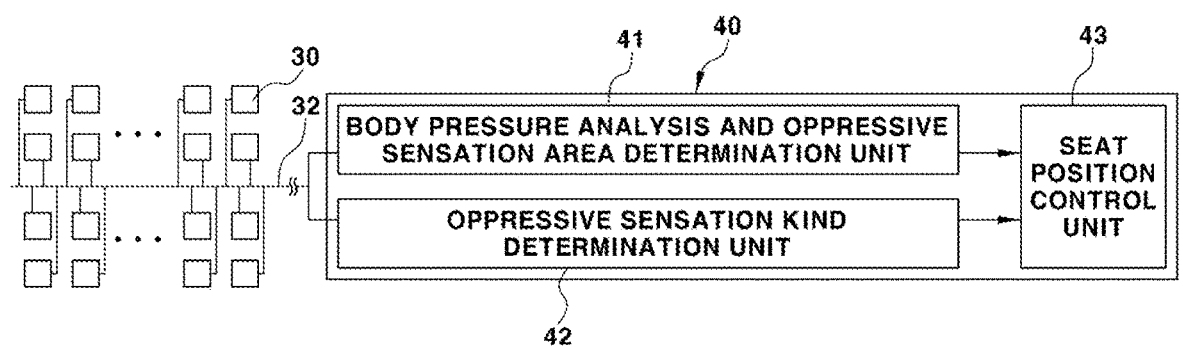
FIG. 3 is a block diagram illustrating the system according to the present invention.

FIG. 2 is a schematic view illustrating an example in which, among elements of a system for evaluating pressure sensation of a vehicle seat according to the present invention, body pressure sensors are installed in a bolster, and FIG. 3 is a block diagram illustrating the system according to the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIG. 2, a shield cover 20 configured to shield various parts placed inside a seat cushion 10 and the bottom portion thereof and to provide a mounting place, on which switches 22 are mounted, are mounted at each of both side parts of the seat cushion 10, and particularly, a plurality of body pressure sensors 30 is installed in a bolster 12 formed at each of both side ends of the seat cushion 10. The body pressure sensors 30 have a size of about 1 cm×1 cm, are coated with flexible plastic to achieve damage protection, and are installed at uniform intervals between a seat cover, which is a covering material of the bolster 12, and a foam pad configured to provide elastic supporting force.

Referring to FIG. 3, the body pressure sensors 30 are connected to a seat controller 40 by signal transmission lines 32, and thereby, body pressure signals measured by the respective body pressure sensors 30 may be transmitted to the seat controller 40 through the signal transmission lines 32. The seat controller 40 may include a body pressure analysis and pressure sensation area determination unit 41 configured to analyze the magnitudes of the body pressure measured by the body pressure sensors 30 and the distribution chart thereof and to determine an area in which there is pressure sensation on the lower body of a passenger due to the bolster 12 or the shield cover 20 depending on results of the analysis of the body pressures, an pressure sensation type determination unit 42 configured to determine whether the pressure sensation on the lower body of the passenger is caused by the bolster 12 or the shield cover 20 based on the magnitudes of the body pressure and the distribution chart thereof, and a seat position control unit 43 configured to adjust the seat cushion 10 to a position to release the pressure sensation.

The body pressure analysis and pressure sensation area determination unit 41 may be configured to analyze the magnitudes of the body pressure measured by the body pressure sensors 30 to distribute data in a matrix by digitizing the measured magnitudes of the body pressure. Further, the body pressure analysis and pressure sensation area determination unit 41 may be configured to compare the magnitudes of the body pressure of a specific area (for example, an area on which the load of the lower body of the passenger is concentrated) included in the data distributed in the matrix, i.e., the results of the analysis of the body pressure, with the magnitudes of the body pressure of other areas, and determine the specific area as the area in which there is pressure sensation due to the bolster 12 or the shield cover 20 based on results of the comparison.

Figure 4:
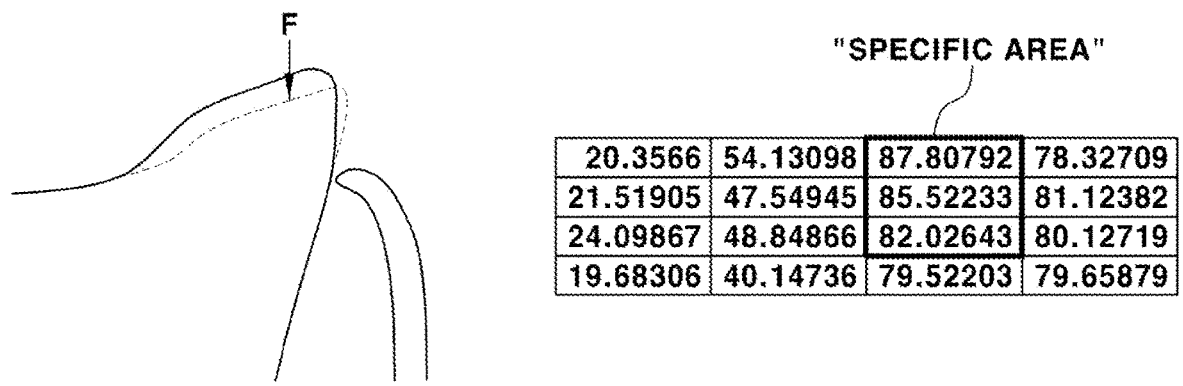
FIGS. 4 and 5 are views illustrating examples in which, among the elements of the system according to the present invention, a body pressure analysis and pressure sensation area determination unit digitizes the magnitudes of a body pressure so as to be distributed in a matrix.

For example, when the passenger receives pressure sensation due to the bolster 12 in the lower body, as shown in FIG. 4, the body pressure analysis and pressure sensation area determination unit 41 may be configured to digitize the magnitudes of the body pressure measured by the body pressure sensors 30 and distribute data, acquired by digitization, in a 4×4 matrix and, when, among the data distributed in the 4×4 matrix, the magnitudes of the body pressure of a specific area are equal to or greater than a reference times (for example, four times) the magnitudes of the body pressure of other areas, as shown in FIG. 4, the specific area is determined as an area in which there is the pressure sensation due to the bolster 12.

Figure 5:
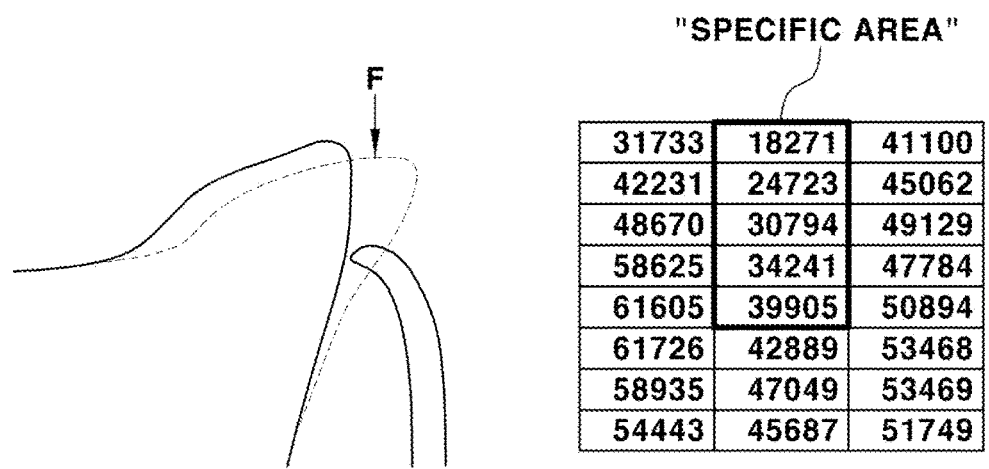

Otherwise, when the passenger receives pressure sensation due to the shield cover 20 other than the bolster 12 in the lower body, as shown in FIG. 5, the body pressure analysis and pressure sensation area determination unit 41 may be configured to digitize the magnitudes of the body pressure measured by the body pressure sensors 30 and distribute data, acquired by digitization, in a 3×8 matrix and, when, among the data distributed in the 3×8 matrix, the magnitudes of the body pressure of a specific area are less than a reference times (for example, 0.15-0.25 times) the magnitudes of the body pressure of other areas, as shown in FIG. 5, the specific area is determined as an area in which there is the pressure sensation due to the shield cover 20 other than the bolster 12.

The pressure sensation kind determination unit 42 may be configured to determine that the pressure sensation on the lower body of the passenger is caused by the shield cover 20 when there is a vertical valley indicating the pressure sensation on the lower body of the passenger due to the edge of the upper end of the shield cover 20 in the body pressure distribution chart, and may be configured to determine that the pressure sensation on the lower body of the passenger is caused by the bolster 12 when there is no vertical valley in the body pressure distribution chart.

Figure 6:
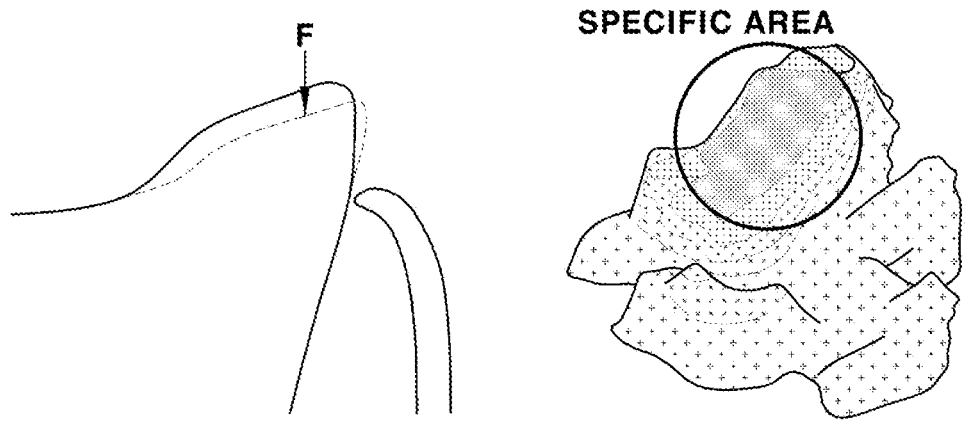
FIG. 6 is a distribution chart of the body pressure measured by the body pressure sensors, among the elements of the system according to the present invention, illustrating a case that a passenger is under pressure sensation due to a bolster in his/her lower body.
Figure 7:
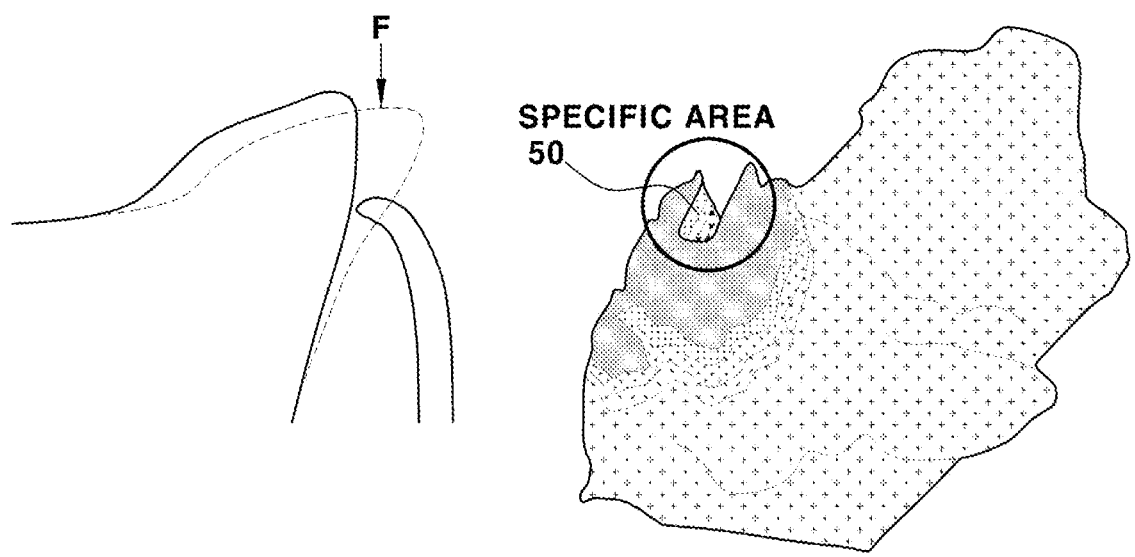
FIG. 7 is a distribution chart of the body pressure measured by the body pressure sensors, among the elements of the system according to the present invention, illustrating a case that a passenger is under pressure sensation due to a shield cover in his/her lower body.
Figure 8:
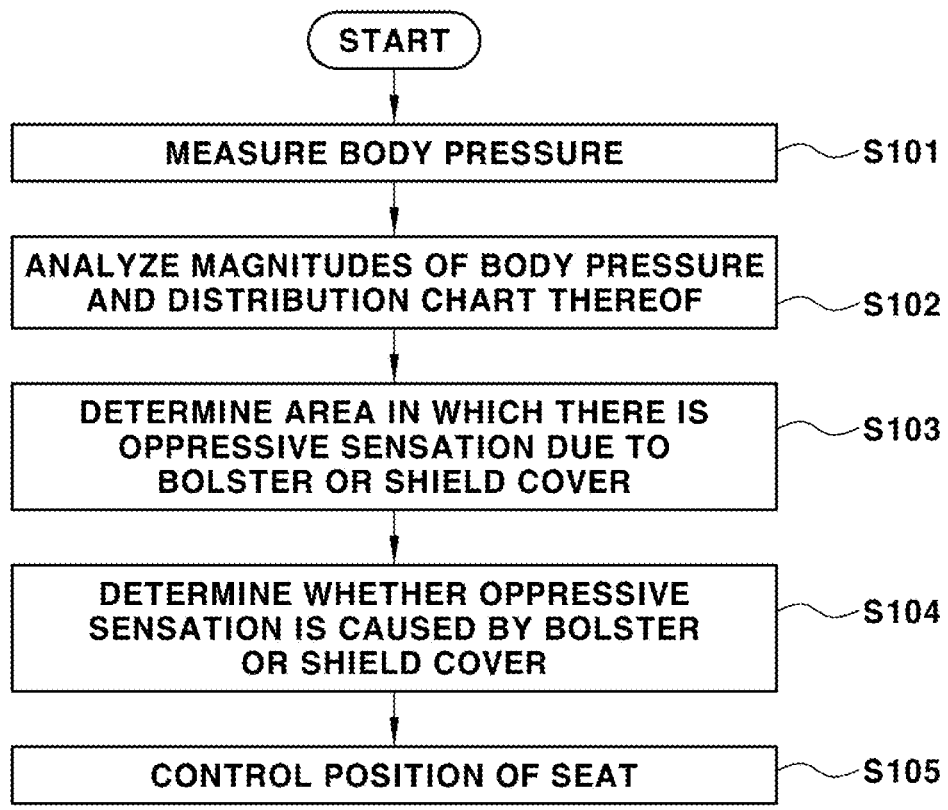
FIG. 8 is a flowchart illustrating a method for evaluating pressure sensation of a vehicle seat according to the present invention.

For example, when the passenger receives the pressure sensation due to the bolster 12 in the lower body, as shown in FIG. 6, the pressure sensation type determination unit 42 may be configured to determine that the pressure sensation on the lower body of the passenger is caused by the bolster 12 when there is no vertical valley in the body pressure distribution chart. On the other hand, when the passenger receives the pressure sensation due to the shield cover 20 in the lower body, as shown in FIG. 7, the pressure sensation type determination unit 42 may be configured to determine that the pressure sensation on the lower body of the passenger is caused by the shield cover 20 when there is a vertical valley 50 indicating the pressure sensation on the lower body of the passenger due to the edge of the upper end of the shield cover 20 in the body pressure distribution chart.

Particularly, the pressure sensation type determination unit 42 may be configured to determine that the pressure sensation on the lower body of the passenger is caused by the shield cover 20 when the length (depth) of the vertical valley 50 is equal to or greater than a reference value and the width thereof is less than another reference value, and the reason for this is that, since the passenger may not feel the pressure sensation due to an object in a pants pocket or the like, it is determined that the pressure sensation on the lower body of the passenger is caused by the shield cover 20 when the length of the vertical valley 50 indicating the pressure sensation on the lower body of the passenger due to the edge of the upper end of the shield cover 20 is equal to or greater than the reference value and the width thereof is less than the reference value.

The seat position control unit 43 may be configured to drive at least one of a known forward and backward driving device for seat cushions configured to adjust the position of the seat cushion 10 in the forward and backward directions, a known height adjustment device for seat cushions configured to adjust the position of the seat cushion 10 in the height direction, a known tilting device for seat cushions configured to adjust the tilting angle of the seat cushion 10, or a known air amount adjustment device configured to adjust the amount of air in the seat cushion 10 and the bolsters 12, based on the area in which there is the pressure sensation and the type of the pressure sensation.

Hereinafter, a method for evaluating pressure sensation of a vehicle seat according to the present invention will be described. First, the body pressure sensors 30 installed in the bolsters 12 of the seat cushion 10 measure the body pressure of a passenger in the state in which the passenger sits on the seat cushion 10 (S101).

For example, when the lower body of the passenger comes into direct or indirect pressurized contact with the bolster 12 or the shield cover 20, such as when the lower body of the passenger comes into pressurized contact with the bolster 12 in the state in which the passenger sits on the seat cushion 10, when the lower body (the hips, thighs, etc.) of the passenger comes into pressurized contact with the bolster 12 or the shield cover 20 while the passenger enters or exits a vehicle, when the passenger perches on the bolster 12 or the shield cover 20 to rest in the parked state of the vehicle, or when the lower side part of the lower body (the hips, thighs, etc.) of the passenger sitting on the seat cushion 10 comes into pressurized contact with the bolster 12 and simultaneously the load of the lower body of the passenger may be transmitted to the shield cover 20, the body pressure sensors 30 may be configured to measure the body pressure of the passenger.

In particular, the body pressure signals measured by the body pressure sensors 30 may be transmitted to the seat controller 40 through the signal transmission lines 32. Thereafter, the body pressure analysis and pressure sensation area determination unit 41 of the seat controller 40 may be configured to analyze the magnitudes of a body pressure and a distribution chart thereof based on the signals measured by the body pressure sensors 30 (S102).

In other words, in Operation S102, the body pressure analysis and pressure sensation area determination unit 41 may be configured to analyze the magnitudes of the body pressure measured by the body pressure sensors 30 to distribute data in a matrix by digitizing the measured magnitudes of the body pressure. For example, when the passenger receives pressure sensation due to the bolster 12 in the lower body, as shown in FIG. 4, the body pressure analysis and pressure sensation area determination unit 41 may be configured to digitize the magnitudes of the body pressure measured by the body pressure sensors 30 and distribute data, acquired by digitization, in a 4×4 matrix.

Otherwise, when the passenger receives pressure sensation due to the shield cover 20 other than the bolster 12 in the lower body, as shown in FIG. 5, the body pressure analysis and pressure sensation area determination unit 41 may be configured to digitize the magnitudes of the body pressure measured by the body pressure sensors 30 and distribute data, acquired by digitization, in a 3×8 matrix.

Subsequently, the body pressure analysis and pressure sensation area determination unit 41 may be configured to determine an area in which there is the pressure sensation on the lower body of the passenger due to the bolster 12 or the shield cover 20 depending on the data distributed in the matrix (S103). In other words, the body pressure analysis and pressure sensation area determination unit 41 may be configured to compare the magnitudes of the body pressure of a specific area (for example, an area on which the load of the lower body of the passenger is concentrated) with the magnitudes of the body pressure of other areas, and thus, determine the specific area as the area in which there is pressure sensation due to the bolster 12 or the shield cover 20.

Figure 9:
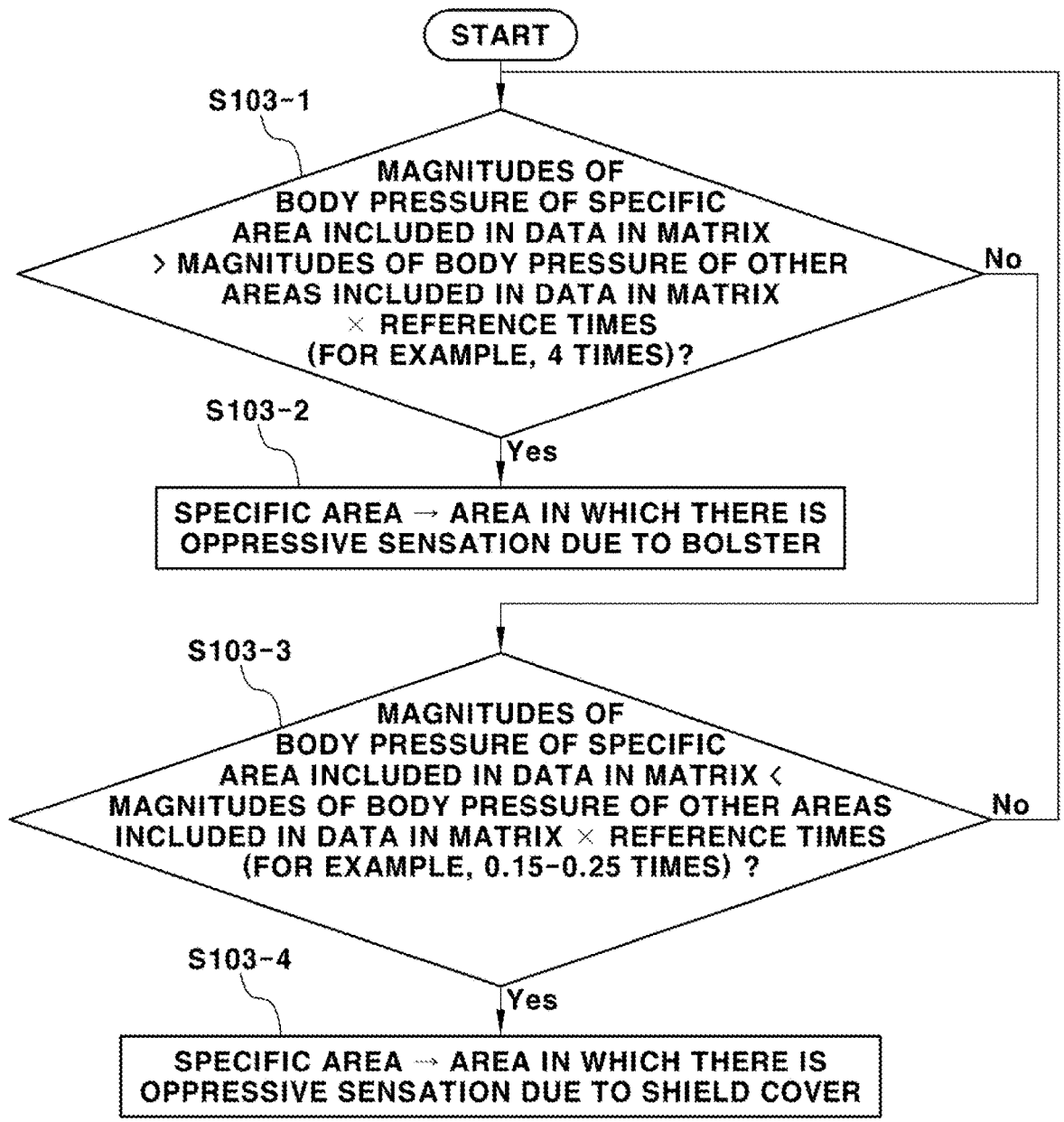
FIG. 9 is a flowchart illustrating a process for determining pressure sensation due to a bolster in the method according to the present invention.
Figure 10:
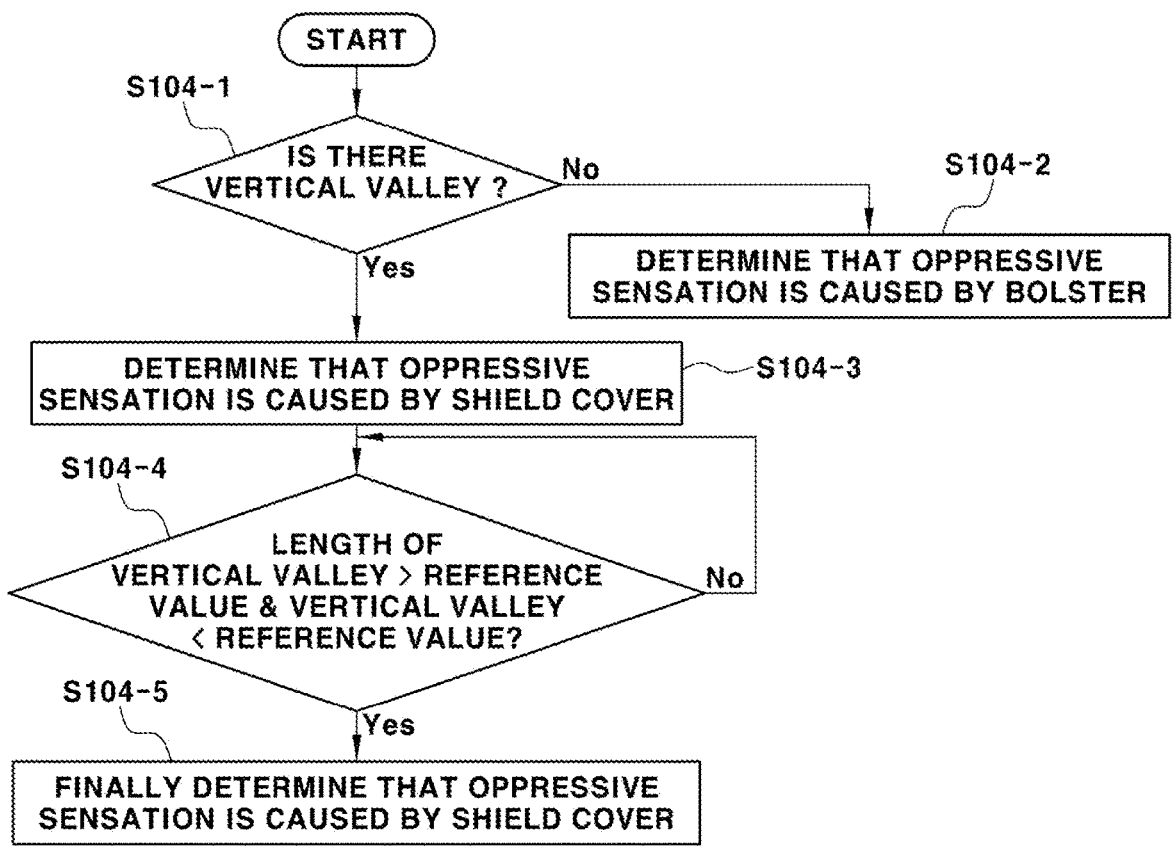
FIG. 10 is a flowchart illustrating a process for determining pressure sensation due to a shield cover in the method according to the present invention.

For this purpose, Operation S103 may include determining whether the magnitudes of the body pressure of the specific area (for example, an area on which the load of the lower body of the passenger is concentrated) are equal to or greater than a reference times (for example, four times) the magnitudes of the body pressure of other areas (S103-1), and determining the specific area as an area in which there is pressure sensation due to the bolster 12 in response to determining that the magnitudes of the body pressure of the specific area are equal to or greater than the reference times (for example, four times) the magnitudes of the body pressure of other areas (S103-2), as shown in FIG. 9.

Further, Operation S103 may include determining whether the magnitudes of the body pressure of the specific area (for example, the area on which the load of the lower body of the passenger is concentrated) are less than a reference times (for example, 0.15-0.25 times) the magnitudes of the body pressure of other areas by (S103-3), and determining the specific area as an area in which there is pressure sensation due to the shield cover 20 other than the bolster 12 in response to determining that the magnitudes of the body pressure of the specific area are less than the reference times (for example, 0.15-0.25 times) the magnitudes of the body pressure of other areas (S103-4), as shown in FIG. 9. Thereafter, the pressure sensation type determination unit 42 may be configured to determine whether the pressure sensation on the lower body of the passenger is caused by the bolster 12 or the shield cover 20 based on the magnitudes of the body pressure and the distribution chart thereof (S104).

Operation S104 may include confirming whether there is a vertical valley indicating the pressure sensation on the lower body of the passenger due to the edge of the upper end of the shield cover 20 in the body pressure distribution chart (S104-1), determining that the pressure sensation on the lower body of the passenger is caused by the bolster 12 when there is no vertical valley in the body pressure distribution chart (S104-2), and determining that the pressure sensation on the lower body of the passenger is caused by the shield cover 20 other than the bolster 12 when there is a vertical valley in the body pressure distribution chart (S104-3).

For example, when the passenger receives the pressure sensation due to the bolster 12 in the lower body, as shown in FIG. 6, it is determined that the pressure sensation on the lower body of the passenger is caused by the bolster 12 when there is no vertical valley in the body pressure distribution chart, and on the other hand, in the case that the passenger receives the pressure sensation due to the shield cover 20 in the lower body, as shown in FIG. 7, it is determined that the pressure sensation on the lower body of the passenger is caused by the shield cover 20 other than the bolster 12 when there is a vertical valley 50 indicating the pressure sensation on the lower body of the passenger due to the edge of the upper end of the shield cover 20 in the body pressure distribution chart.

In particular, even when there is the vertical valley 50 in the body pressure distribution chart, the passenger may not feel pressure sensation due to an object in a pants pocket since the vertical valley 50 is generated by the object in the pants pocket, and therefore, it may be determined whether the pressure sensation on the lower body of the passenger is caused by the shield cover 20 based on the length and width of the vertical valley 50. For this purpose, determination as to whether the pressure sensation on the lower body of the passenger is caused by the bolster 12 or the shield cover 20 (S104) may further include determining whether the length (depth) of the vertical valley 50 is equal to or greater than a reference value (for example, 3.5 cm) and the width thereof is less than another reference value (for example, 2.5 cm) (S104-4), and finally determining that the pressure sensation on the lower body of the passenger is caused by the shield cover 20 upon determining that the length (depth) of the vertical valley 50 is equal to or greater than the corresponding reference value and the width thereof is less than the corresponding reference value (S104-5).

Concretely, when the length (depth) of the vertical valley 50 is equal to or greater than the corresponding reference value and the width thereof is less than the corresponding reference value, the load of the lower body of the passenger is concentrated on the edge of the upper end of the shield cover 20 and thus the passenger may feel pressure sensation in the lower body although an object is in his/her pants pocket, and therefore, it is finally determined that the pressure sensation on the lower body of the passenger is caused by the shield cover 20 when the length (depth) of the vertical valley 50 is equal to or greater than the corresponding reference value and the width thereof is less than the corresponding reference value.

Thereafter, the seat position control unit 43 may be configured to adjust the seat cushion 10 to a position to release the pressure sensation (S105). Particularly, control of the seat cushion 10 to be adjusted to the position to release the pressure sensation (S105) may be performed by adjusting at least one of the position of the seat cushion 10 in the forward and backward directions, the height of the seat cushion 10, the tilting angle of the seat cushion 10, the amount of air in the air cells inside the seat cushion 10 and the bolsters 12, or the angle of the bolsters 12 in the inward and outward directions.

In other words, the seat position control unit 43 may be configured to drive at least one of a known forward and backward driving device for seat cushions configured to adjust the position of the seat cushion 10 in the forward and backward directions, a known height adjustment device for seat cushions configured to adjust the position of the seat cushion 10 in the height direction, a known tilting device for seat cushions configured to adjust the tilting angle of the seat cushion 10, or a known air amount adjustment device configured to adjust the amount of air in the air cells inside the seat cushion 10 and the bolsters 12, based on the area in which there is the pressure sensation and the type of the pressure sensation, thereby being capable of releasing the pressure sensation on the lower body of the passenger.

For example, when the lower body of the passenger is pressed onto the rear part of the bolster 12 and thus the passenger receives pressure sensation in the lower body, the pressure sensation on the lower body of the passenger may be released by performing an operation of distributing the body pressure by moving the seat cushion 10 backwards by driving the forward and backward driving device for seat cushions, an operation of distributing the body pressure by moving the seat cushion 10 upwards by driving the height adjustment device for seat cushions, an operation of relieving the pressure sensation by reducing the amount of air in the air cells inside the bolsters 12 by driving the air amount adjustment device, etc.

Otherwise, when the lower body of the passenger is pressed onto the front part of the bolster 12 and thus the passenger receives pressure sensation in the lower body, the pressure sensation on the lower body of the passenger may be released by performing an operation of distributing the body pressure by moving the seat cushion 10 forwards by driving the forward and backward driving device for seat cushions, an operation of distributing the body pressure by tilting the front part of the seat cushion 10 downwards by driving the tilting device for seat cushions, an operation of relieving the pressure sensation by reducing the amount of air in the cells of the bolsters 12 by driving the air amount adjustment device, etc.

As is apparent from the above description, a system and method for evaluating pressure sensation of a vehicle seat according to the present invention provide the following effects.

First, the magnitudes of the body pressure of the lower body of a passenger and the distribution thereof due to a bolster or a shield cover are measured using body pressure sensors, an area in which there is the pressure sensation on the lower body of the passenger due to the bolster or the shield cover is determined, whether the pressure sensation on the lower body of a passenger is caused by the bolster or the shield cover may be determined based on the measured magnitudes of the body pressure and the distribution thereof, thereby being capable of adjusting a seat cushion to a position to release the pressure sensation.

Second, when the lower body of the passenger comes into direct or indirect pressurized contact with the bolster or the shield cover and thus the passenger feels pressure sensation in the lower body, the seat cushion is adjusted to the position to release the pressure sensation, thereby being capable of providing convenience in passenger's sitting on the vehicle seat.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A system for evaluating pressure sensation of a vehicle seat, comprising:
   a seat cushion having a bolster formed at each of both side ends thereof;
   a shield cover mounted at each of both side surfaces of the seat cushion;
   a plurality of body pressure sensors installed in a designated arrangement within the bolster; and
   a seat controller connected to the body pressure sensors through signal transmission lines, wherein the seat controller includes:
   a body pressure analysis and pressure sensation area determination unit and configured to determine an area in which there is a pressure sensation on a lower body of a passenger due to the bolster or the shield cover by analyzing magnitudes of a body pressure measured by the body pressure sensors and a distribution chart thereof;
   a pressure sensation type determination unit and configured to determine whether the pressure sensation on the lower body of the passenger is caused by the bolster or the shield cover; and
   a seat position control unit and configured to adjust the seat cushion to a position to release the pressure sensation;
   wherein the pressure sensation type determination unit is configured to:
   determine that the pressure sensation on the lower body of the passenger is caused by the shield cover when there is a vertical valley indicating the pressure sensation on the lower body of the passenger due to an edge of an upper end of the shield cover in the distribution chart of the body pressure; and
   determine that the pressure sensation on the lower body of the passenger is caused by the bolster when there is no vertical valley in the distribution chart of the body pressure.

2. The system of claim 1, wherein the body pressure analysis and pressure sensation area determination unit is configured to:
   digitize the magnitudes of the body pressure measured by the body pressure sensors to distribute data, acquired by the digitization, in a matrix form;
   compare the magnitudes of the body pressure of a specific area included in the data distributed in the matrix, with the magnitudes of the body pressure of other areas; and
   determine the specific area as the area in which there is the pressure sensation due to the bolster or the shield cover based on results of the comparison.

3. The system of claim 2, wherein the body pressure analysis and pressure sensation area determination unit is configured to determine the specific area as an area in which there is the pressure sensation due to the bolster, when the magnitudes of the body pressure of the specific area are equal to or greater than a reference multiple of an average magnitude of the body pressure in the other areas.

4. The system of claim 2, wherein the body pressure analysis and pressure sensation area determination unit is configured to determine the specific area as an area in which there is the pressure sensation due to the shield cover other than the bolster, when the magnitudes of the body pressure of the specific area are less than a reference multiple of an average magnitude of the body pressure in the other areas.

5. The system of claim 1, wherein the pressure sensation type determination unit is configured to determine that the pressure sensation on the lower body of the passenger is caused by the shield cover when a length of the vertical valley is equal to or greater than a reference value and a width thereof is less than another reference value.

6. A method for evaluating pressure sensation of a vehicle seat, the method comprising:
   measuring, by a plurality of body pressure sensors installed in a bolster of a seat cushion, a body pressure of a passenger;
   analyzing, by a controller, magnitudes of the body pressure and a distribution chart thereof based on signals output from the body pressure sensors;
   determining, by the controller, an area in which there is a pressure sensation on a lower body of the passenger due to the bolster or a shield cover;
   determining, by the controller, whether the pressure sensation on the lower body of the passenger is caused by the bolster or the shield cover depending on the magnitudes of the body pressure and the distribution chart thereof; and
   adjusting, by the controller, the seat cushion to a position to release the pressure sensation, based on the area in which there is the pressure sensation and a type of the pressure sensation;
   wherein, in the determining of whether the pressure sensation on the lower body of the passenger is caused by the bolster or the shield cover,
   the pressure sensation on the lower body of the passenger is determined to be caused by the shield cover when there is a vertical valley indicating the pressure sensation on the lower body of the passenger due to an edge of an upper end of the shield cover in the distribution chart of the body pressure, and
   the pressure sensation on the lower body of the passenger is determined to be caused by the bolster when there is no vertical valley in the distribution chart of the body pressure.

7. The method of claim 6, wherein, in the analyzing of the magnitudes of the body pressure and the distribution chart thereof, the magnitudes of the body pressure measured by the body pressure sensors are digitized, and data, acquired by the digitization, is distributed in a matrix form.

8. The method of claim 6, wherein, in the determining of the area in which there is the pressure sensation on the lower body of the passenger due to the bolster or the shield cover, a specific area included in the data distributed in the matrix is determined as an area in which there is the pressure sensation due to the bolster, when the magnitudes of the body pressure of the specific area are equal to or greater than a reference multiple of an average magnitude of the body pressure in other areas.

9. The method of claim 6, wherein, in the determining of the area in which there is the pressure sensation on the lower body of the passenger due to the bolster or the shield cover, a specific area included in the data distributed in the matrix is determined as an area in which there is the pressure sensation due to the shield cover other than the bolster, when an average magnitude of the body pressure in the specific area is less than a reference multiple of an average magnitude of the body pressure in other areas.

10. The method of claim 6, wherein it is finally determined that the pressure sensation on the lower body of the passenger is caused by the shield cover when a length of the vertical valley is equal to or greater than a reference value and a width thereof is less than another reference value.

11. The method of claim 6, wherein the adjusting of the seat cushion to the position to release the pressure sensation is performed by adjusting at least one of a position of the seat cushion in forward and backward directions, a height of the seat cushion, a tilting angle of the seat cushion, an amount of air in air cells inside the seat cushion and the bolster, or an angle of the bolster in inward and outward directions.

\* \* \* \* \*